United States Patent [19]

Tamura

[11] Patent Number: 5,842,055
[45] Date of Patent: Nov. 24, 1998

[54] LENS BARREL AND OPTICAL APPARATUS

[75] Inventor: Masahisa Tamura, Yokohama, Japan

[73] Assignee: Canon Kabushiki Kaisha, Tokyo, Japan

[21] Appl. No.: 880,039

[22] Filed: Jun. 20, 1997

[30] Foreign Application Priority Data

Jun. 25, 1996 [JP] Japan ................................. 8-164879

[51] Int. Cl.⁶ .............................. G03B 9/02; G02B 15/14; G02B 9/00
[52] U.S. Cl. ............................ 396/72; 359/676; 359/740; 396/505
[58] Field of Search ................................. 396/63, 64, 72, 396/505; 359/694, 676, 739, 740, 738

[56] References Cited

U.S. PATENT DOCUMENTS 5,353,081  10/1994  Quattrini ................................. 396/72
5,434,714   7/1995  Kohmoto et al. ....................... 359/740

FOREIGN PATENT DOCUMENTS 56-52291   12/1981  Japan .
6-186477    7/1994  Japan .
8-179190    7/1996  Japan .

*Primary Examiner*—W. B. Perkey
*Attorney, Agent, or Firm*—Robin, Blecker & Daley

[57] ABSTRACT

A lens barrel or an optical apparatus comprises a lens unit arranged to be movable in an optical axis direction, a plurality of shafts which hold a stop arranged to block undesirable light and which extend in the optical axis direction, and a support member which supports the plurality of shafts while allowing the plurality of shafts to be moved in the optical axis direction, wherein the plurality of shafts are moved by being pushed by the lens unit, thereby moving the stop.

32 Claims, 10 Drawing Sheets

LENS BARREL AND OPTICAL APPARATUS

BACKGROUND OF THE INVENTION

1. Field of the Invention

This invention relates to a lens barrel and an optical apparatus such as a camera.

2. Description of Related Art

Cutting down a flare light generated within a lens barrel has been one of the subjects of efforts made to enhance the optical performance of the lens barrels of cameras. The generation of such a flare results in such a low-contrast picture that appears as if it is covered all over with a mist. Main conceivable causes for the flare include the incidence of a useless light within the effective diameter of a phototaking lens and a reflection light coming from a part located outside of the effective lens diameter or from a lens holding member or the like. To obtain good pictures by cutting off the flare, a means for limiting a passing light, which is called a flare-cut stop, is generally used for the optical system of a lens barrel.

In the case of a mono-focal lens, a flare-cut stop is arranged within a lens barrel to have its position and its diameter fixed. In the case of a zoom lens, on the other hand, a flare-cut stop is arranged within a lens barrel to have its position and its diameter variable with changes taking place in focal length.

BRIEF SUMMARY OF THE INVENTION

It is a principal object of the invention to provide a lens barrel simply arranged to be capable of smoothly moving a stop in an optical axis direction and an optical apparatus such as a camera which is provided with the lens barrel and is arranged to obtain image information through the lens barrel.

In accordance with a first aspect of the invention, there is provided a lens barrel or an optical apparatus which comprises a lens unit arranged to be movable in an optical axis direction, a plurality of shafts which hold a stop arranged to block undesirable light and which extend in the optical axis direction, and a support member which supports the plurality of shafts while allowing the plurality of shafts to be moved in the optical axis direction, wherein the plurality of shafts are moved by being pushed by the lens unit, thereby moving the stop.

In accordance with a second aspect of the invention, there is provided a lens barrel or an optical apparatus which comprises a first lens unit arranged to be movable in an optical axis direction, and a second lens unit which supports a plurality of shafts while allowing the plurality of shafts to be moved in the optical axis direction, the plurality of shafts holding a stop arranged to block undesirable light and extending in the optical axis direction, wherein the plurality of shafts are moved by being pushed by the first lens unit, thereby moving the stop.

In accordance with a third aspect of the invention, there is provided a lens barrel or an optical apparatus which comprises first and third lens units arranged to be movable in an optical axis direction, and a second lens unit disposed between the first and third lens units, the second lens unit supporting a plurality of shafts while allowing the plurality of shafts to be moved in the optical axis direction, the plurality of shafts holding a stop arranged to block undesirable light and extending in the optical axis direction, wherein the plurality of shafts are moved by being pushed by the first lens unit toward the third lens unit, thereby moving the stop toward the third lens unit, and wherein the plurality of shafts are moved by being pushed by the third lens unit toward the first lens unit, thereby moving the stop toward the first lens unit.

In accordance with a fourth aspect of the invention, there is provided a lens barrel or an optical apparatus which comprises a movable unit arranged to move in an optical axis direction, a shaft which holds a stop arranged to block undesirable light and which extends in the optical axis direction, and a support member which supports the shaft while allowing the shaft to be moved in the optical axis direction, wherein the shaft is moved by being pushed by the movable unit, thereby moving the stop.

The above and further objects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

Figure 1:
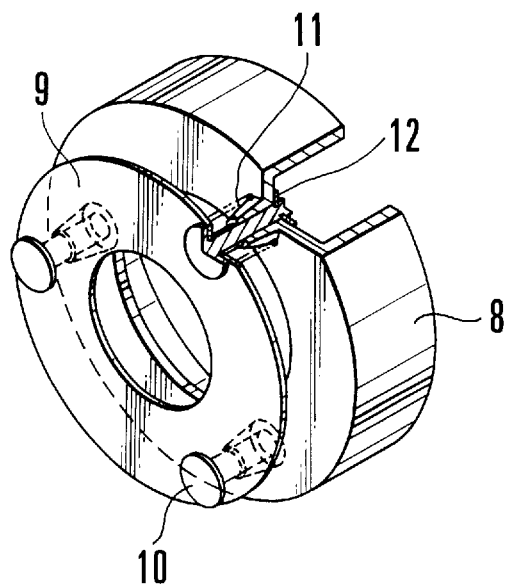
FIG. 1 is a perspective view showing a flare-cut stop portion of a lens barrel according to the invention as a first embodiment thereof.
Figure 2:
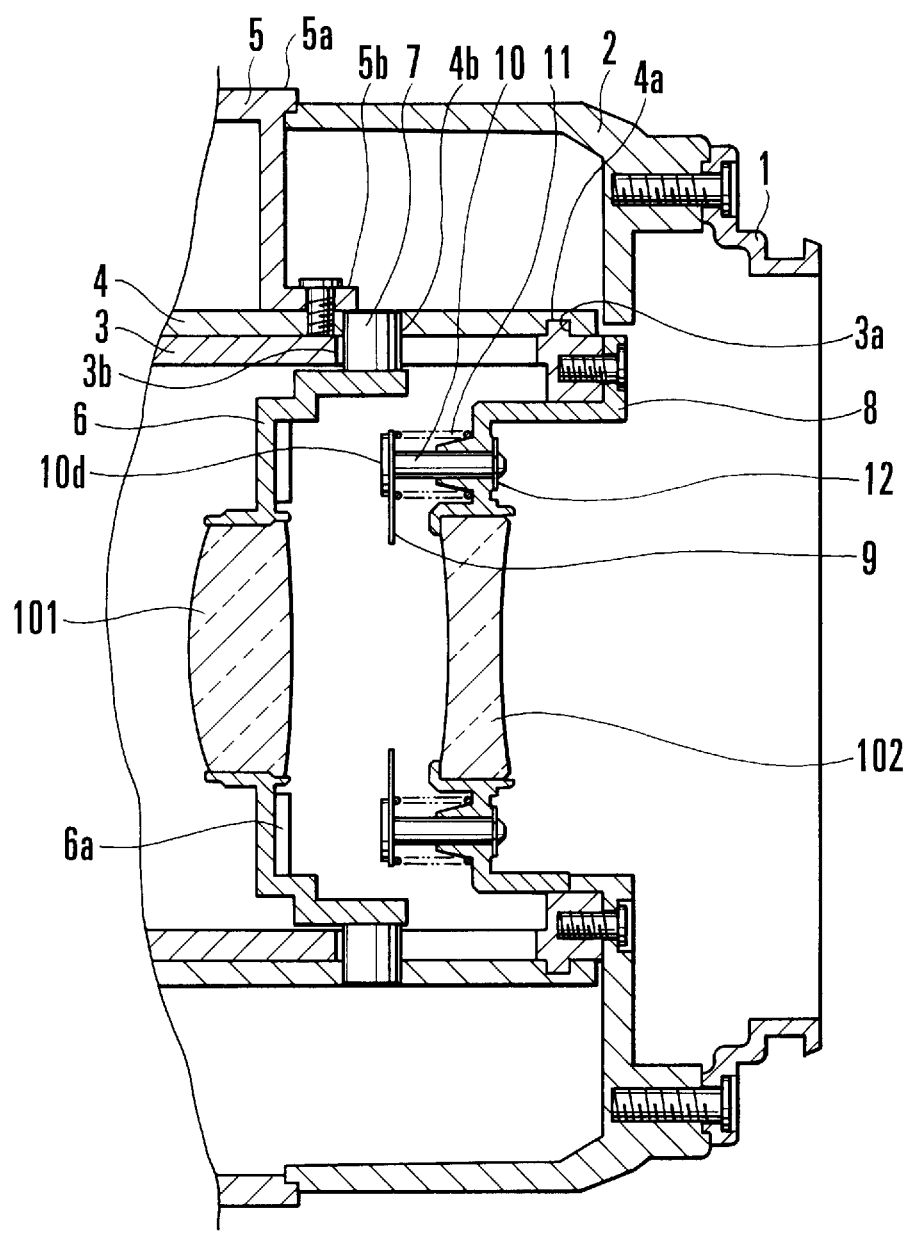
FIG. 2 is a sectional view showing the lens barrel in a telephoto end position.
Figure 3:
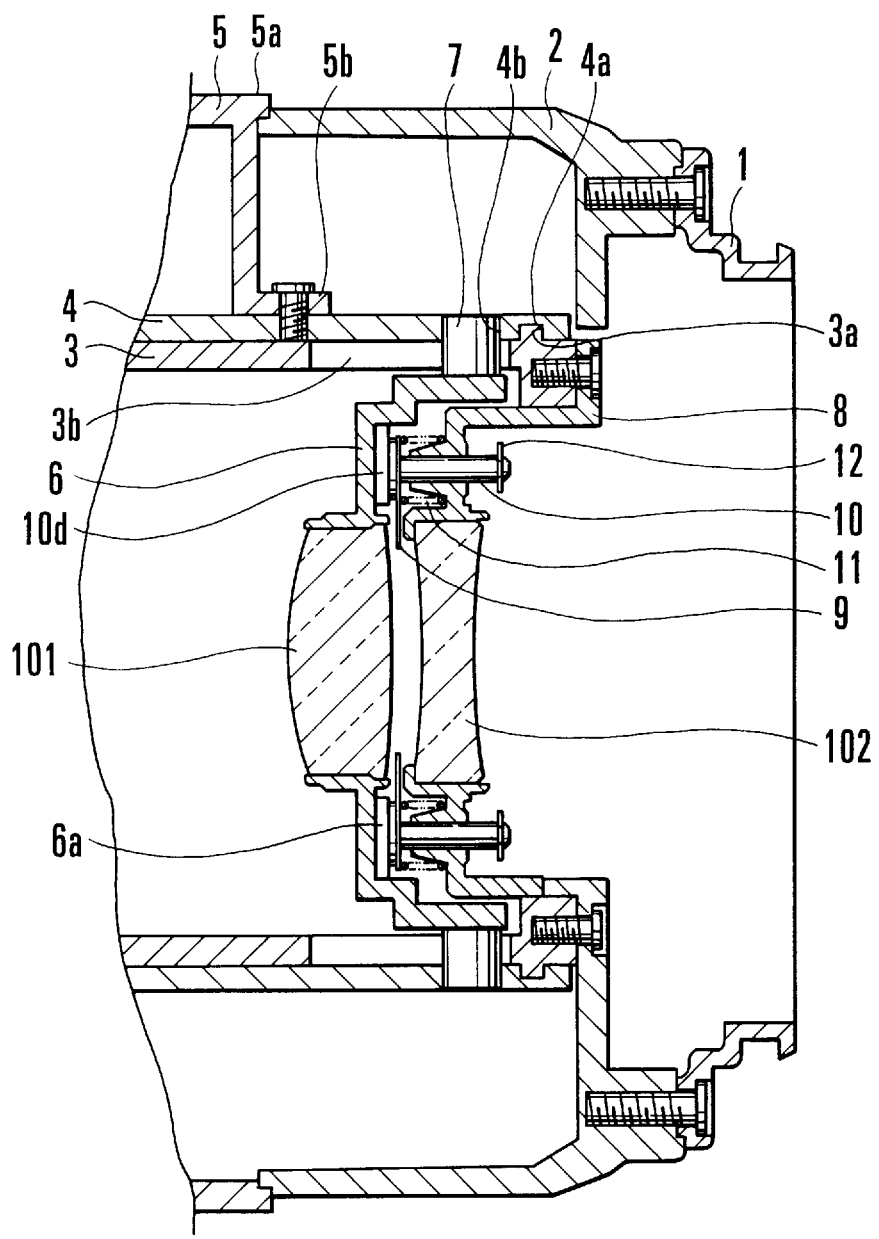
FIG. 3 is a sectional view showing the lens barrel in a wide-angle end position.

FIGS. 1, 2 and 3 show an interchangeable zoom lens barrel adapted for a single-lens reflex camera as a first embodiment of the invention. FIG. 1 is a perspective view showing a flare-cut stop portion in the first embodiment. FIGS. 2 and 3 are sectional views showing in part the zoom lens barrel. FIG. 2 shows the zoom lens barrel in a telephoto end position of zooming, while FIG. 3 shows the zoom lens barrel in a wide-angle end position of zooming.

Referring to FIG. 2, the lens barrel is provided with a mount 1 for mounting the lens barrel on a camera body. A fixed tube 2 is arranged to have the mount 1 secured thereto and to support a guide tube 3, which is an internal structural member of the lens barrel.

The guide tube 3 has a cam tube 4 fitted on the outer diameter side thereof and lens units fitted in the inner diameter side thereof. The cam tube 4 has a bayonet groove 4a formed in its inner circumferential side. A bayonet claw 3a which is formed on the guide tube 3 engages the bayonet groove 4a. By virtue of this arrangement, the cam tube 4 is supported by the guide tube 3 so as to be rotatable around an optical axis.

A zoom ring 5 has a zoom operation part 5a which appears on the outside of the lens barrel, and has a fixing part 5b where the zoom ring 5 is secured to the cam tube 4 by means of a screw or the like. The zoom ring 5 is thus arranged to be rotatably supported by the guide tube 3 in such a way as to be rotatable around the optical axis together with the cam tube 4.

A first lens frame 6 is arranged to hold a first lens unit 101 on its inner circumferential side. The outer circumferential side of the first lens frame 6 is fitted in the inner circumferential side of the guide tube 3. The first lens frame 6 is thus movably supported by the guide tube 3 to be movable in the optical axis direction. The first lens frame 6 is provided with abutting projections 6a which are arranged, in the rear of the first lens frame 6 and on the outer side of the first lens unit 101, to be opposed to large diameter parts 10a of stop shafts 10 (to be described later) in the optical axis direction.

Rollers 7 are secured to the first lens frame 6. In the case of the first embodiment, the number of the rollers 7 is at least three. Each of the rollers 7 engages a guide slot 3b which is formed in the circumferential wall of the guide tube 3 to extend along the optical axis and a cam groove 4b which is arranged in the cam tube 4 to determine the extent of movement of the first lens frame 6 caused by zooming.

A second lens frame 8 is arranged to hold a second lens unit 102 on its inner circumferential side. The outer circumferential side of the second lens frame 8 is secured to the rear end of the guide tube 3. In other words, the second lens frame 8 is fixed and is thus arranged not to be moved during zooming.

Figure 4:
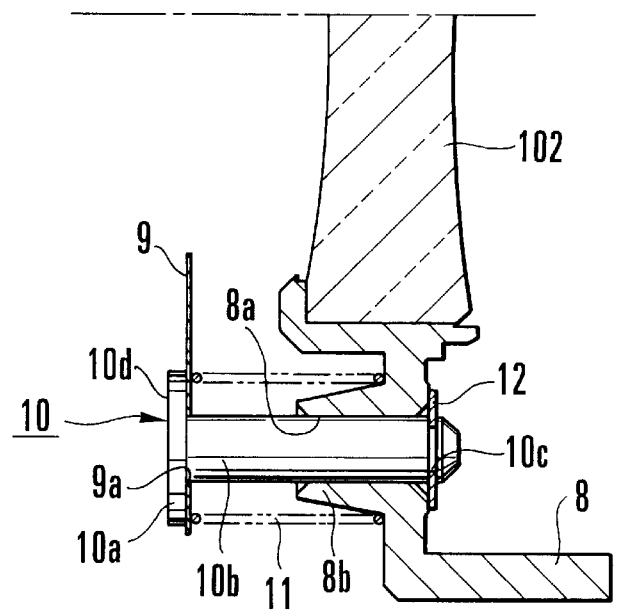
FIG. 4 is an enlarged view showing in part the flare-cut stop portion.

A flare-cut stop 9 has an inner circumferential aperture part arranged to pass only an effective light flux therethrough. FIG. 4 shows in detail the arrangement of the flare-cut stop 9. As shown, three holes 9a are formed in the outer peripheral part of the flare-cut stop 9. The stop shafts 10 are fixedly inserted respectively into the holes 9a of the flare-cut stop 9.

Each of the stop shafts 10 is provided with a large diameter part 10a, a small diameter part 10b, and a groove part 10c for a washer. The small diameter parts 10b of the stop shafts 10 are inserted into the holes 9a of the stop 9, respectively. The large diameter parts 10a of the stop shafts 10 are arranged to abut on a front side (on the left side as viewed in the drawing) of the flare-cut stop 9.

Further, the small diameter parts 10b are inserted in bearing parts 8a which are formed on the second lens frame 8 and arranged to be the same in number and position as those of the holes 9a of the flare-cut stop 9. The stop shafts 10 and the flare-cut stop 9 are thus arranged to be movable in the optical axis direction.

After the stop shafts 10 are inserted into the bearing parts 8a of the second lens frame 8, stop washers 12 are press-fitted into the groove parts 10c of the stop shafts 10, respectively, and are thus arranged to be used in positioning the flare-cut stop 9 as well as to prevent the stop shafts 10 from pulling off forward in the optical axis direction.

Stop springs 11, which are compression springs, are arranged to urge the flare-cut stop 9 forward in the optical axis direction. The stop springs 11 are disposed around the stop shafts 10 between the rear side (right side as viewed in the drawing) of the flare-cut stop 9 and the front side of the second lens frame 8.

A protruding part 8b which serves as a guide for each of the stop springs 11 is formed around each of the bearing parts 8a of the second lens frame 8. The root of the protruding part 8b is arranged to have a diameter which is about the same as the inside diameter of each of the stop springs 11 and to have the right end part of the stop spring 11 secured thereto, as shown in FIG. 4. Further, the protruding part 8b is formed in a shape of a conic frustum tapering down forward from its root, so that the stop spring 11 can be smoothly compressed even if the stop spring 11 warps in the direction of diameter.

As described above, the movable flare-cut stop portion in the first embodiment is thus composed of a simple arrangement including the flare-cut stop 9, the stop shafts 10, the stop springs 11, the stop washers 12, and the bearing parts 8a (including the protruding parts 8b) formed on the second lens frame 8. Further, the numbers of the stop shafts 10, the stop springs 11, the stop washers 12 vary with the arrangement of other components parts disposed within the lens barrel. However, in order to ensure the flatness of the flare-cut stop 9, these parts are preferably disposed at three parts evenly spaced along the circumference of the flare-cut stop 9, as shown in FIG. 1.

Figure 5:
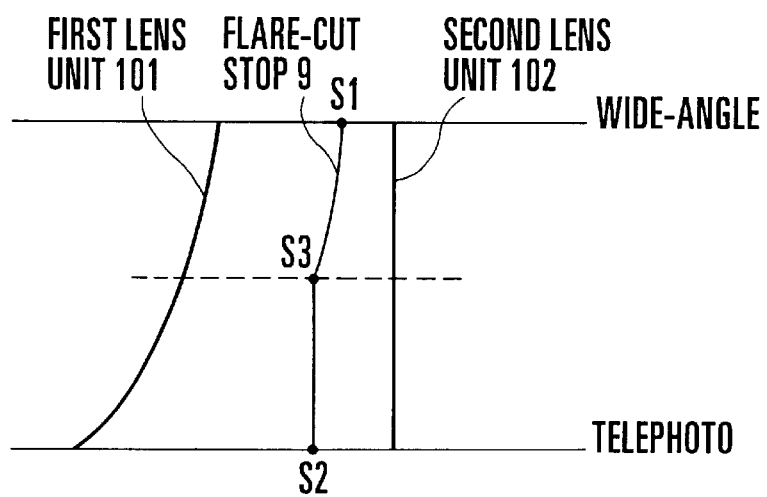
FIG. 5 schematically shows the loci of movements of lens units and a flare-cut stop caused by zooming in the lens barrel according to the first embodiment.

A zooming operation of the lens barrel which is arranged as described above and an action to be performed by the flare-cut stop 9 during the zooming operation are next described with referring also to FIG. 5. FIG. 5 shows the locus of zooming movement of the first lens unit 101, that of the second lens unit 102 and that of the flare-cut stop 9 during zooming. In FIG. 5, the ordinate axis shows the focal length of the lens barrel while the abscissa axis shows the positions of these parts obtained in the optical axis direction.

In a telephoto end position of zooming as shown in FIG. 2, the first lens frame 6 with the first lens unit 101 and the second lens frame 8 with the second lens unit 102 are spaced widest. The rear side of the first lens frame 6 is located away from the flare-cut stop 9 and the large diameter parts 10a of the stop shafts 10. The flare-cut stop 9 has been moved by the urging force of the stop springs 11 to a position where the stop washers 12 are abutting on the second lens frame 8, i.e., a position S2 shown in FIG. 5. The length of each of the stop shafts 10, the position of each of the stop washers 12, etc., are determined in such a way as to have the flare-cut stop 9 in an optimum position when the lens barrel is in the telephoto end position.

With the lens barrel in this telephoto end position, when the operator (photographer) turns the zoom operation part 5a around the optical axis to cause the cam tube 4 which is secured to the zoom ring 5 to rotate integrally with the zoom ring 5, each of the rollers 7, which engage the cam grove 4b formed on the cam tube 4 and the guide slot 3b of the guide tube 3 fixed to the mount 1, moves rearward (toward the wide-angle end position) in the optical axis direction. Then, the first lens frame 6 to which the rollers 7 are secured moves in the same direction.

Then, the distance between the first lens frame 6 and the second lens frame 8 becomes narrower. While the zooming position of the lens barrel thus shifts from the telephoto end toward the wide-angle end, the rear side face (the abutting projections 6a) of the first lens frame 6 does not abut on the large diameter part 10a of each of the stop shafts 10 until the first lens frame 6 comes immediately before a predetermined middle position. Therefore, the position of the flare-cut stop 9 remains unchanged until the first lens frame 6 reaches the predetermined middle position.

However, when the first lens frame 6 reaches the predetermined middle position, the abutting projections 6a of the first lens frame 6 abut on the large diameter parts 10a, i.e., front end faces 10d, of the stop shafts 10. After that, when the first lens frame 6 moves further toward the wide-angle end, the stop shafts 10 and the flare-cut stop 9 are pushed by the abutting projections 6a of the first lens frame 6 to be caused to move together with the first lens frame 6 rearward in the optical axis direction from a position S3 (=S2) shown in FIG. 5.

Then, in the wide-angle end position of zooming as shown in FIG. 3, the flare-cut stop 9 reaches a position S1 shown in FIG. 5. Further, the protruding extent of the abutting projections 6a of the first lens frame 6 in the optical axis direction is set in such a way as to give an optimum flare-cut stop position in this state.

In zooming from the wide-angle end position toward the telephoto end position, the first lens frame 6 moves forward in the optical axis direction as the zoom operation part 5a is operated by the operator. Then, the flare-cut stop 9 which has been at the wide-angle end position SI is caused by the urging forces of the stop springs 11 to move forward in the optical axis direction together with the first lens frame 6 accordingly as the first lens frame 6 moves away from the second lens frame 8.

When the flare-cut stop 9 reaches the position S3 with the first lens frame 6 moved from the wide-angle end to the predetermined middle position, the stop washers 12 abut on the rear side face of the second lens frame 8 to prevent any further forward movement of the flare-cut stop 9. Then, the abutting projections 6a of the first lens frame 6 move away from the large diameter parts 10a of the stop shafts 10. Therefore, the position of the flare-cut stop 9 remains unchanged while the first lens frame 6 is moving from the predetermined middle position to the telephoto end position.

According to the arrangement of the first embodiment as described above, the movable flare-cut stop 9 can be set without newly arranging any moving member in addition to the first lens frame 6 (the first lens unit 101). It is another advantage of the first embodiment that, since the flare-cut stop 9 is moved by being pushed by the first lens frame 6, the flare-cut stop 9 can be moved without recourse to any lens frame driving means such as a cam groove.

Further, in the first embodiment, the abutting projections 6a are arranged to abut on the large diameter parts 10a of the top shafts 10 at the position S3 shown in FIG. 5. By virtue of this arrangement, the flare-cut stop 9 can be smoothly moved without rattling. It is another advantage that the flare-cut stop 9 can be formed by using a thin, low-cost material.

A smooth movement of the flare-cut stop 9 would be prevented much by a slanting posture of the stop shafts 10 resulting from degradation in flatness of the flare-cut stop 9 itself. In view of this, the bearing parts 8a are arranged at the second lens frame 8 to prevent the stop shafts 10 from slanting.

Further, if a thick material is used in forming the flare-cut stop 9 for improvement in strength, the use of the thick material increases the area of an end face defining an inner diameter of the flare-cut stop. Then, the increased area of the end face tends to cause a ghost by reflecting light within the optical system. Therefore, in the case of the first embodiment, the thickness of the flare-cut stop 9 is arranged to be not greater than 1 mm.

While the flare-cut stop 9 is in a plate-like shape in the case of the first embodiment, the shape of the flare-cut stop 9 in accordance with the invention is not limited to the plate-like shape. The flare-cut stop may be formed in any other shapes as desired, for example, by plastic molding or the like.

Figure 6:
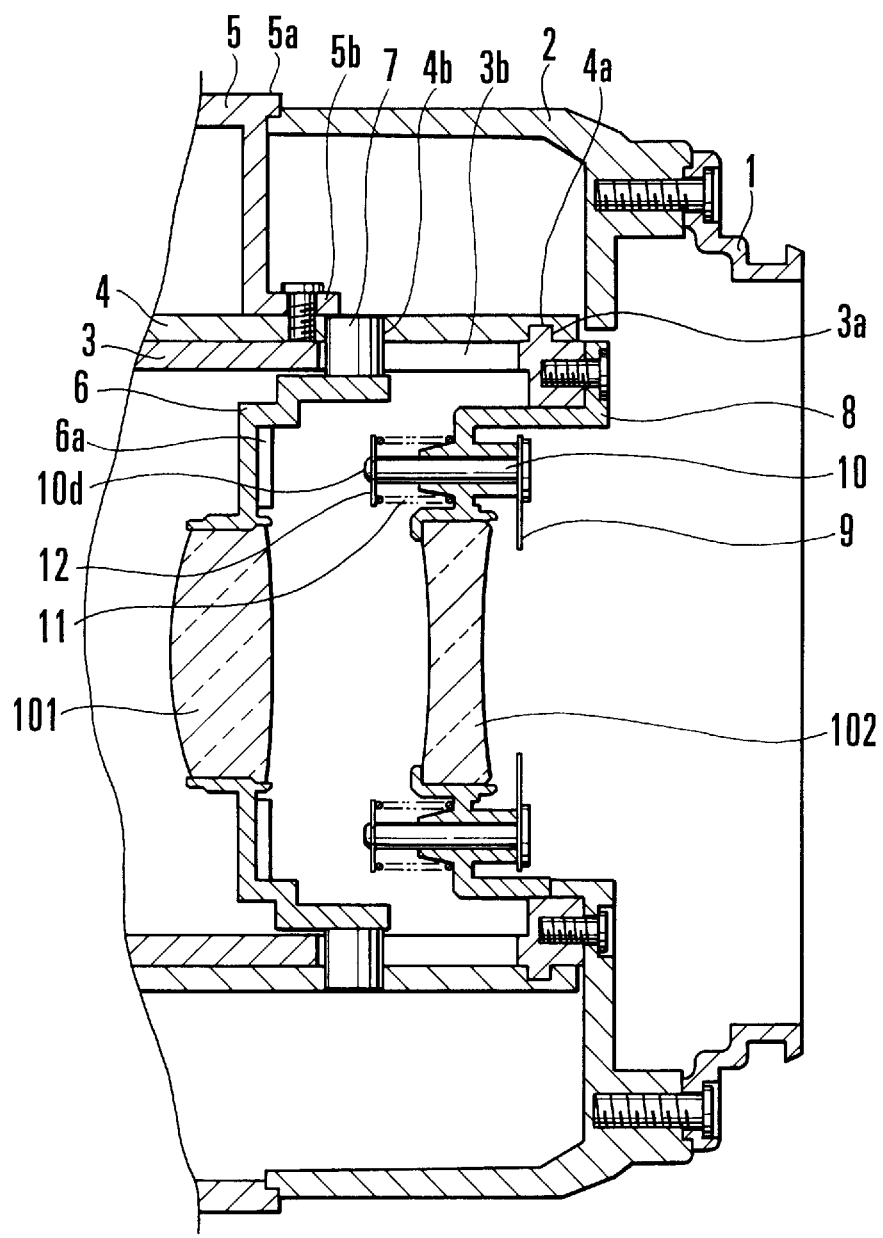
FIG. 6 is a sectional view showing a lens barrel arranged as a second embodiment of the invention, in a telephoto end position.
Figure 7:
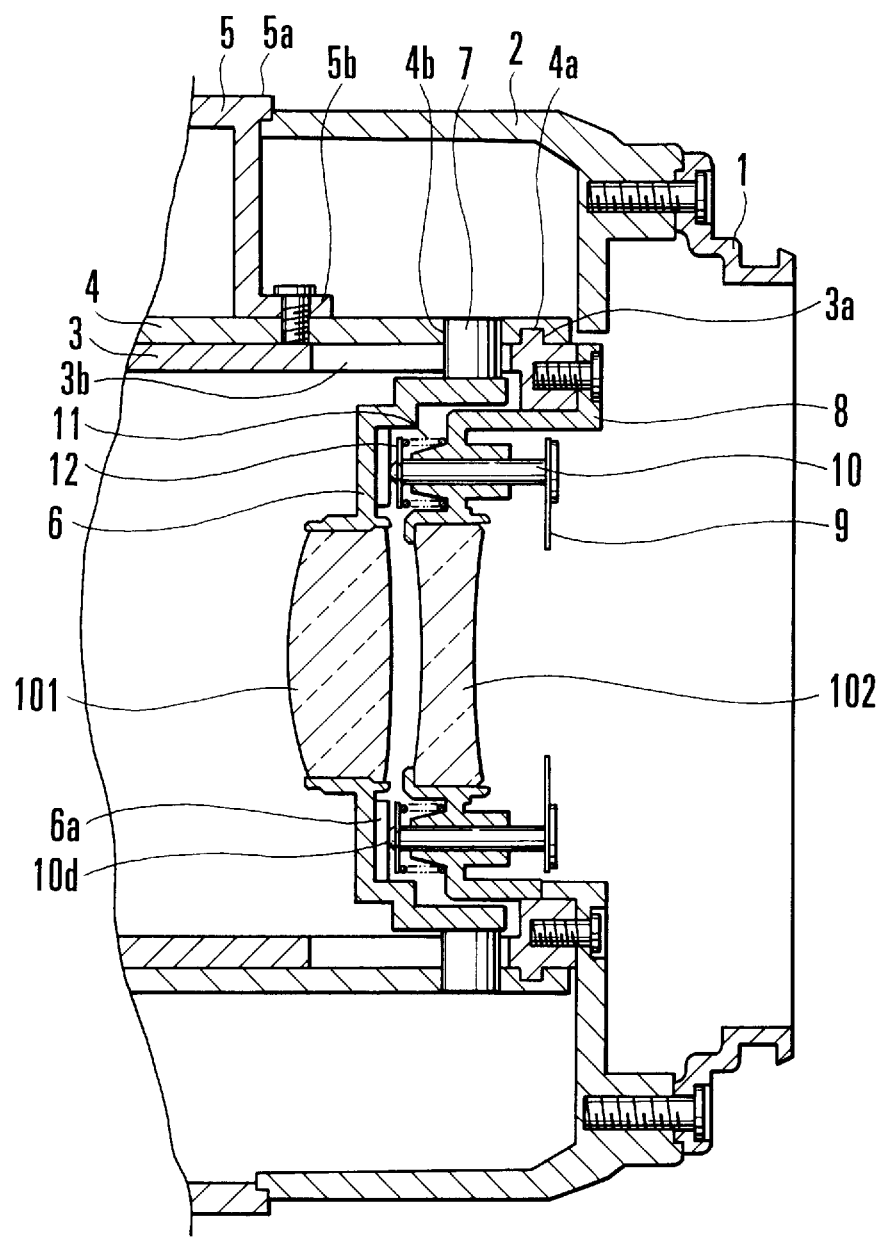
FIG. 7 is a sectional view showing the lens barrel in the second embodiment, in a wide-angle end position.

FIGS. 6 and 7 show an interchangeable zoom lens barrel for a single-lens reflex camera, which is arranged according to the invention as a second embodiment thereof. A flare-cut stop portion of the lens barrel is shown in a telephoto end position of zooming in FIG. 6 and in a wide-angle end position of zooming in FIG. 7.

Main component parts of the second embodiment are the same as those of the first embodiment shown in FIGS. 1 to 5. Therefore, these parts are indicated by the same reference numerals as in the case of the first embodiment without further description of them. The second embodiment differs from the first embodiment in that the flare-cut stop 9 is disposed rearwardly of the second lens frame 8 in the optical axis direction.

Figure 8:
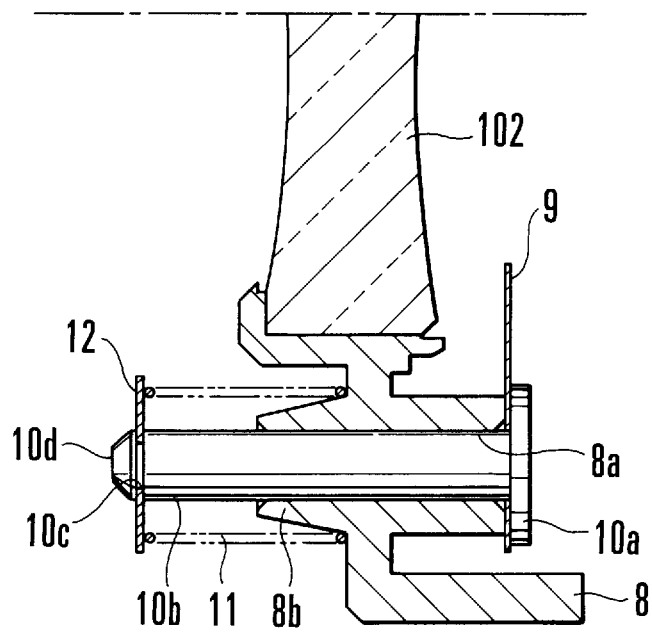
FIG. 8 is an enlarged view showing in part a flare-cut stop portion of the lens barrel according to the second embodiment.

FIG. 8 shows in detail the flare-cut stop portion in the second embodiment. As shown, the stop shafts 10 on which the flare-cut stop 9 is mounted in such a way as to abut on their large diameter parts 10a are inserted into the bearing parts 8a of the second lens frame 8 from behind in the optical axis direction. The stop washers 12 are press-fitted and secured to the ends of the small diameter parts 10b of the stop shafts 10, respectively. The stop springs 11 which are arranged to urge the stop shafts 10 and the flare-cut stop 9 to move forward in the optical axis direction (in the direction of bringing the flare-cut stop 9 nearer to the second lens frame 8) are mounted between the stop washers 12 and the outer circumferential parts of the bearing parts 8a which are located in front of the second lens frame 8.

With the lens barrel arranged in this manner, the flare-cut stop 9 remains stationary until the first lens frame 6 is moved by zooming from the telephoto end position to the predetermined middle position. After the first lens frame 6 reaches the predetermined middle position to abut on the abutting faces 10d of the small diameter parts 10b of the stop shafts 10, when the first lens frame 6 moves further toward the wide-angle end position, the stop shafts 10 and the flare-cut stop 9 are pushed by the first lens frame 6 to move, together with the first lens frame 6, rearward in the optical axis direction and toward the second lens frame 8. In case where the first lens frame 6 moves from the wide-angle end position toward the telephoto end position, on the other hand, the above-stated actions are reversely performed. The movement loci of the parts in the second embodiment can be expressed by shifting the locus of movement S1-S2-S3 of the flare-cut stop 9 shown in FIG. 5 to the right side of the locus of movement of the second lens frame 102.

As apparent from the above-stated arrangement, the flare-cut stop 9 may be disposed on either side of the second lens frame 8. In other words, the lens barrel arrangement according to the invention allows a great latitude to design work as the flare-cut stop can be disposed on any of the two sides having an optical advantage over the other.

Figure 9:
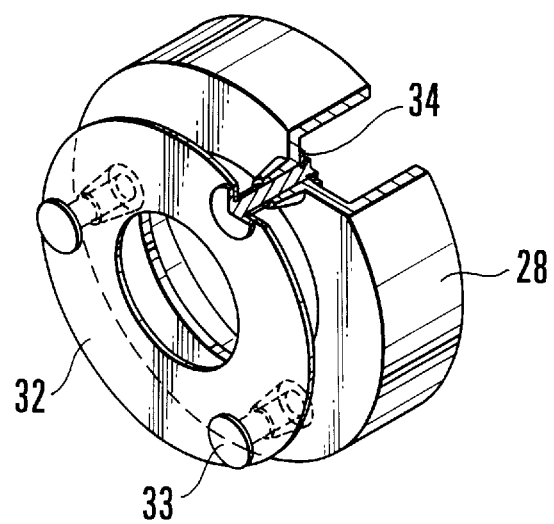
FIG. 9 is a perspective view showing a flare-cut stop portion of a lens barrel arranged according to the invention as a third embodiment thereof.
Figure 10:
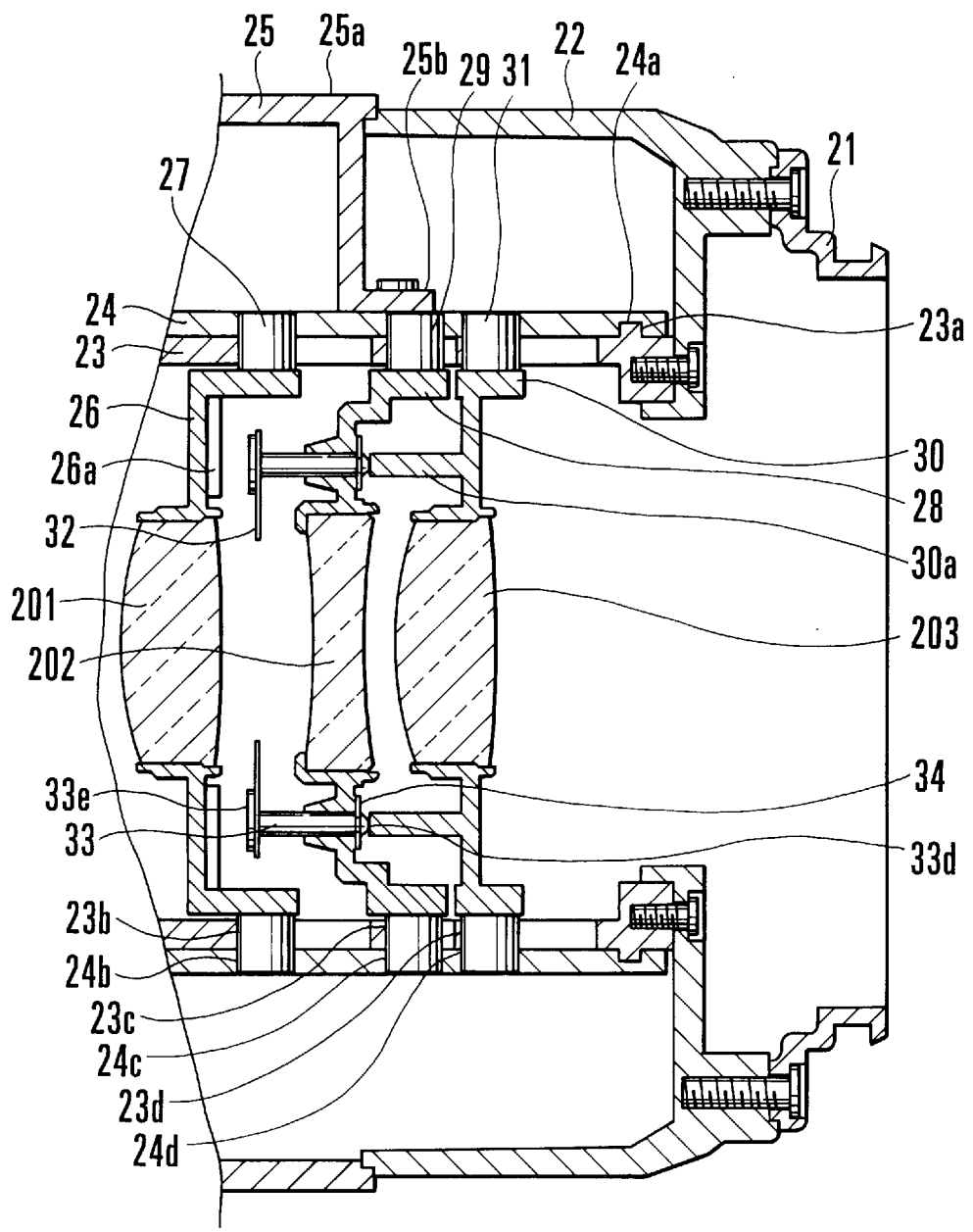
FIG. 10 is a sectional view showing the lens barrel in the third embodiment, in a telephoto end position.
Figure 11:
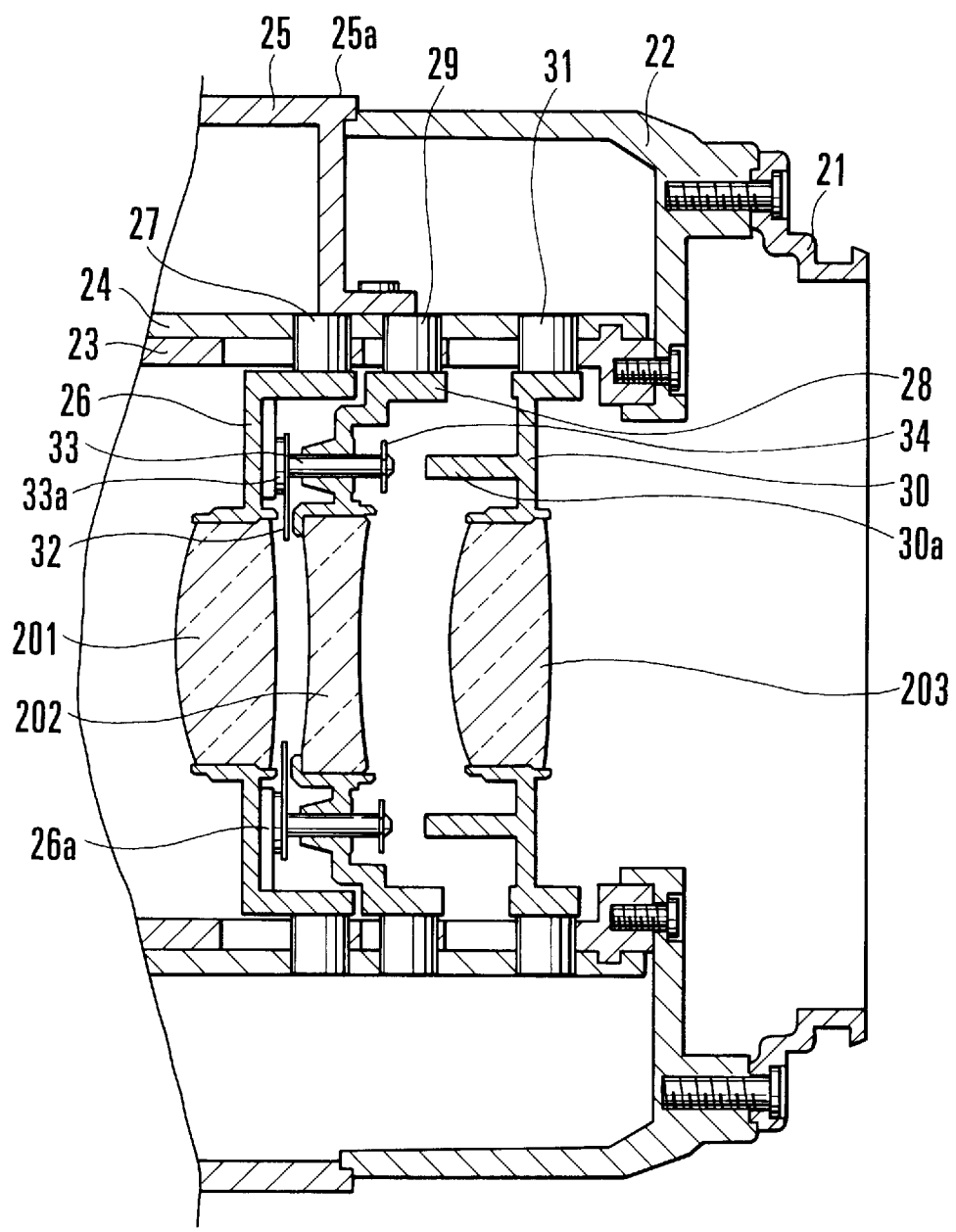
FIG. 11 is a sectional view showing the lens barrel in the third embodiment, in a wide-angle end position.

FIGS. 9, 10 and 11 show an interchangeable zoom lens barrel for a single-lens reflex camera arranged according to the invention as a third embodiment thereof. A flare-cut stop portion of the lens barrel is shown, in a perspective view in FIG. 9, in a telephoto end position of zooming in FIG. 10 and in a wide-angle end position of zooming in FIG. 11.

Referring to FIG. 10, the lens barrel is provided with a mount 21 for mounting the lens barrel on a camera body. A fixed tube 22 is arranged to have the mount 1 secured thereto and to support a guide tube 23, which is an internal structural member of the lens barrel.

The guide tube 23 has a cam tube 24 fitted on the outer diameter side thereof and lens units fitted in the inner diameter side thereof. The cam tube 24 has a bayonet groove 24a in its inner circumferential side. A bayonet claw 23a which is formed on the guide tube 23 engages the bayonet groove 24a. By virtue of this arrangement, the cam tube 24 is supported by the guide tube 23 to be rotatable around an optical axis.

A zoom ring 25 has a zoom operation part 25a which appears on the outside of the lens barrel, and has a fixing part 25b where the zoom ring 25 is secured to the cam tube 24 by means of a screw or the like. The zoom ring 25 is thus arranged to be rotatably supported by the guide tube 23 in such a way as to be rotatable around the optical axis together with the cam tube 24.

A first lens frame 26 is arranged to hold a first lens unit 201 on its inner circumferential side. The outer circumferential side of the first lens frame 26 is fitted in the inner circumferential side of the guide tube 23. The first lens frame 26 is thus movably supported by the guide tube 23 to be movable in the optical axis direction. The first lens frame 26 is provided with abutting projections 26a which are arranged, in the rear of the first lens frame 26 and on the outer side of the first lens unit 201, to be opposed to large diameter parts 33a of stop shafts 33 (to be described later) in the optical axis direction.

Rollers 27 are secured to the first lens frame 26. In the case of the third embodiment, there are provided at least three rollers 27 on the first lens frame 26. Each of the rollers 27 engages a guide slot 23b which is formed in the circumferential wall of the guide tube 23 to extend in the optical axis direction and a cam groove 24b which is arranged in the cam tube 24 to determine an extent of movement of the first lens frame 26 caused by zooming.

A second lens frame 28 is arranged to hold a second lens unit 202 on its inner circumferential side. The outer circumferential side of the second lens frame 28 is fitted in the inner circumferential side of the guide tube 23. In other words, the second lens frame 28 is supported by the guide tube 23 in such a way as to be movable in the optical axis direction.

Rollers 29 are secured to the second lens frame 28. In the case of the third embodiment, there are provided at least three rollers 29 on the second lens frame 28. Each of the rollers 29 engages a guide slot 23c which is formed in the circumferential wall of the guide tube 23 to extend in the optical axis direction and a cam groove 24c which is arranged in the cam tube 24 to determine an extent of movement of the second lens frame 28 caused by zooming.

A third lens frame 30 holds a third lens unit 203 on its inner circumferential side. The outer side of the third lens frame 30 is fitted in the inner side of the guide tube 23. The third lens frame 30 is thus supported by the guide tube 23 in such a way as to be movable in the optical axis direction. The third lens frame 30 is provided with projections 30a which are formed in the front side of its outer peripheral part and are opposed to small diameter parts 33b of the stop shafts 33 in the optical axis direction.

Rollers 31 are secured to the third lens frame 30. In the case of the third embodiment, there are provided at least three rollers 31 on the third lens frame 30. Each of the rollers 31 engages a guide slot 23d which is formed in the circumferential wall of the guide tube 23 to extend in the optical axis direction and a cam groove 24d which is provided in the cam tube 24 and is arranged to determine the extent of movement of the third lens frame 30 caused by zooming.

Figure 12:
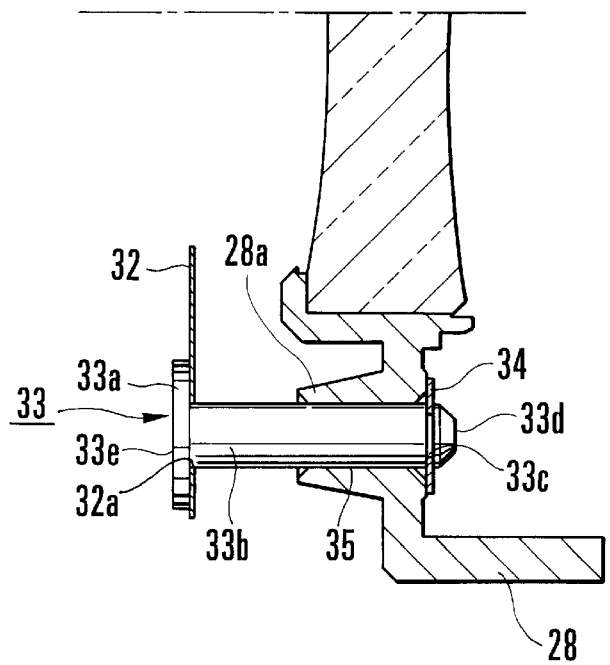
FIG. 12 is an enlarged view showing in part a flare-cut stop portion of the lens barrel in the third embodiment of the invention.

A flare-cut stop 32 has an inner circumferential aperture part arranged to pass only an effective light flux therethrough. FIG. 12 shows in detail the arrangement of the flare-cut stop 32. As shown, three holes 32a are formed in the outer peripheral part of the flare-cut stop 32. The stop shafts 33 are fixedly inserted respectively into these holes 32a of the flare-cut stop 32.

Each of the stop shafts 33 is provided with a large diameter part 33a, a small diameter part 33b, and a groove part 33c for a washer. The small diameter parts 33b of the stop shafts 33 are inserted into the holes 32a of the flare-cut stop 32. The large diameter parts 33a of the stop shafts 33 are arranged to abut on a front side (the left side as viewed in the drawing) of the flare-cut stop 32.

The small diameter parts 33b are inserted in bearing parts 28a which are formed in the second lens frame 28 and arranged in the same number and the same positions as those of the holes 32a of the flare-cut stop 33. The stop shafts 33 and the flare-cut stop 32 are thus movably supported by the bearing part 28a in such a way as to be movable in the optical axis direction.

After the stop shafts 33 are inserted into the bearing parts 28a of the second lens frame 28, stop washers 34 are press-fitted into the groove parts 33c of the stop shafts 32 and are thus arranged to be used for positioning the flare-cut stop 32 as well as to prevent the stop shafts 33 from pulling off forward in the optical axis direction.

For the purpose of bringing about an apposite amount of frictional force between each of the small diameter parts 33b and the corresponding bearing part 28a, a friction material 35 is applied to the inner circumferential wall of each bearing part 28a. The amount of the frictional force obtainable by the friction material 35 is arranged to be just enough to prevent the flare-cut stop 32 from being moved in the optical axis direction by its own weight, vibrations, impacts or the like. Therefore, the frictional force is preferably as small as possible for eliminating any unevenness of torque that tends to occur while a zooming operation is in process.

As described above, the movable flare-cut stop portion in the third embodiment is composed of a simple arrangement including the flare-cut stop 32, the stop shafts 33, the stop washers 34, and the bearing parts 28a which are formed on the second lens frame 28. The numbers of the stop shafts 33 and the stop washers 34 vary with the arrangement of other parts within the lens barrel. However, in order to ensure the flatness of the flare-cut stop 32, they are preferably disposed at three parts which are evenly spaced along the circumference of the flare-cut stop 32, as shown in FIG. 9.

Figure 13:
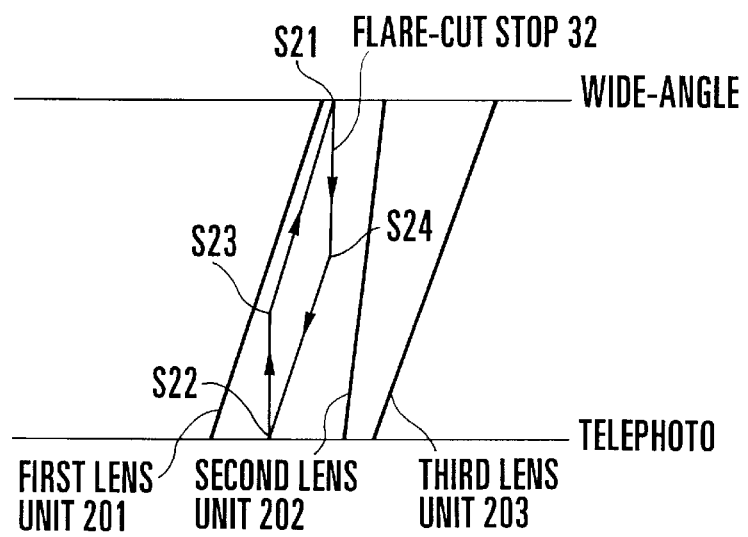
FIG. 13 schematically shows the loci of movements of lens units and a flare-cut stop caused by zooming in the lens barrel according to the third embodiment.

A zooming operation of the lens barrel which is arranged as described above and an action to be performed by the flare-cut stop 32 during the zooming operation are next described referring also to FIG. 13. FIG. 13 shows the loci of zooming movements of the first, second and third lens units 201, 202 and 203 and the flare-cut stop 32. In FIG. 13, the ordinate axis shows the focal length of the lens barrel while the abscissa axis shows positions obtained in the optical axis direction.

In a telephoto end position of zooming as shown in FIG. 10, the first lens frame 26, i.e., the first lens unit 201, and the second lens frame 28, i.e., the second lens unit 202, are spaced widest while the second lens frame 28 and the third lens frame 30, i.e., the third lens unit 203, are spaced narrowest. In this state, the rear side of the first lens frame 26 is located away from the flare-cut stop 32 and the large diameter parts 33a of the stop shafts 33, while the small diameter parts 33b of the stop shafts 33 are pushed by the protrusions 30a of the third lens frame 30 to bring the flare-cut stop 32 to a position where the stop washers 34 are abutting on the rear face of the second lens frame 28, i.e., a position S22 shown in FIG. 13. The length of each of the stop shafts 33, the position of each of the stop washers 34 and the height of the projections 30a are determined in such a way as to have the flare-cut stop 32 in an optimum position when the lens barrel is in the telephoto end position.

With the lens barrel in the telephoto end position, when the operator turns the zoom operation part 25a around the optical axis to cause the cam tube 24 which is secured to the zoom ring 25 to rotate integrally with the zoom ring 25, the rollers 27, 29 and 31 which engage the cam grooves 24b, 24c and 24d of the cam tube 24 and the guide slots 23b, 23c and 23d of the guide tube 23 which is fixed with respect to the mount 21 move rearward, i.e., toward the wide-angle end position, in the optical axis direction. Then, the first, second and third lens frames 26, 28 and 30 to which the rollers 27, 29 and 31 are secured move in the same direction. As shown in FIG. 13, the moving amounts of the first and third lens frames 26 and 30 are greater than that of the second lens frame 28. Therefore, the first lens frame 26 comes nearer to the second lens frame 28 while the third lens frame 30 moves away from the second lens frame 28.

While the distance between the first lens frame 26 and the second lens frame 28 is decreasing, the rear side face (the abutting projections 26a) of the first lens frame 26 does not abut on the large diameter parts 33a of the stop shafts 33 until the first lens frame 26 comes immediately before a first middle position. Therefore, no change takes place in the position of the stop shafts 33 and the flare-cut stop 32. Besides, the frictional force of the friction material 35 acting between each of the stop shafts 33 and the corresponding bearing part 28a does not allow the positions of the stop shafts 33 and the flare-cut stop 32 to readily vary even if some shocks or vibrations are imparted to the lens barrel.

However, when the first lens frame 26 reaches the first middle position, the abutting projections 26a of the first lens frame 26 abut on the large diameter parts 33a of the stop shafts 33 (their front end faces 33e). Then, when the first lens frame 26 moves further toward the wide-angle end, the stop shafts 33 and the flare-cut stop 32 are pushed by the abutting projections 26a of the first lens frame 26, against the frictional force of the friction material 35, to move together with the first lens frame 26 rearward in the optical axis direction from a position S23 (=S22) shown in FIG. 13.

In the wide-angle end position shown in FIG. 11, the flare-cut stop 32 reaches a position S21 shown in FIG. 13. Further, the protruding extent of the abutting projections 26a of the first lens frame 6 in the optical axis direction is set in such a way as to give an optimum flare-cut stop position in this state.

In zooming from the wide-angle end position toward the telephoto end position, the first, second and third lens frames 26, 28 and 30 move forward in the optical axis direction (toward the telephoto end position) as the zoom operation part 25a is operated by the operator. More specifically, the first lens frame 26 moves away from the second lens frame 28 and the third lens frame 30 comes nearer to the second lens frame 28.

While the space between the second lens frame 28 and the third lens frame 30 is becoming narrower, the projections 30a of the third lens frame 30 do not come to abut on the small diameter parts 33b of the stop shafts 33 until the third lens frame 30 comes immediately before a second middle position. Therefore, before the second middle position, no change takes place in the positions of the stop shafts 33 and the flare-cut stop 32. Besides, the frictional force of the friction material 35 acting between each of the stop shafts 33 and the corresponding bearing part 28a does not allow the positions of the stop shafts 33 and the flare-cut stop 32 to readily vary even if some shocks or vibrations are imparted to the lens barrel. Further, the abutting projections 26a of the first lens frame 26 move away from the large diameter parts 33a of the stop shafts 33 immediately after moving from the wide-angle end position.

However, when the third lens frame 30 reaches the second middle position, the projections 30a of the third lens frame 30 come to abut on the small diameter parts 33b of the stop shafts 33 (the rear end faces 33d). When the third lens frame 30 moves further toward the wide-angle end position, the stop shafts 33 and the flare-cut stop 32 are pushed, against the frictional force of the friction material 35, by the projections 30a of the third lens frame 30 to move from a position S24 (=S21) shown in FIG. 13 forward in the optical axis direction together with the third lens frame 30.

When the flare-cut stop 32 reaches the position S22, the stop washers 34 abut on the rear face of the second lens frame 28 to prevent the flare-cut stop 32 from moving further forward. At the same time, the first, second and third lens frames 26, 28 and 30 take their telephoto end positions.

According to the arrangement of the third embodiment as described above, the movable flare-cut stop 32 can be set without newly arranging any moving member in addition to the three lens frames 26, 28 and 30 (the lens units 201, 202 and 203). Another advantage of the third embodiment lies in that, since the flare-cut stop 32 is arranged to be pushed and moved by the first and third lens frames 26 and 30, the flare-cut stop 32 can be moved without recourse to any driving means such as the cam grooves 24b, 24c and 24d which are for driving the lens frames 26, 28 and 30.

Further, in the third embodiment, the plate thickness of the flare-cut stop 32 is also arranged to be not greater than 1 mm, so as to prevent a ghost or the like.

While the flare-cut stop 32 is formed in a plate-like shape in the case of the third embodiment, a flare-cut stop member in accordance with the invention is not limited to this shape.

In each of the embodiments described above, the flare-cut stop member may be formed by molding integrally with the stop shafts.

The invention may be carried out by combining as necessary the embodiments and their modifications or their technological elements disclosed. The invention is applicable not only to a zoom lens but also to the lens barrel of a two-focal-length lens.

Further, the invention is applicable to the lens barrels of cameras of varied kinds, such as a single-lens reflex camera, a lens-shutter type camera, a video camera, etc., optical apparatuses other than cameras and other apparatuses, devices adapted for cameras, optical apparatuses and other apparatuses, and component elements forming these apparatuses and devices.

In accordance with the invention as described in the foregoing, a stop member can be arranged to be movable in the optical axis direction without necessitating use of any additional moving groups for that purpose. Besides, since the stop member is arranged to be pushed to move by a predetermined lens unit or by other lens units, it is possible to drive the stop member without using any cam helicoid or the like that is similar to a cam helicoid used for driving a lens. By virtue of this arrangement, the stop member can be incorporated in such a compact lens barrel that has hitherto prevented its incorporation due to insufficiency of space available therein.

Further, according to the invention, the lens barrel is arranged such that, a lens other than a specific lens comes to abut on the stop member when it moves to a predetermined extent from its start position. By virtue of this arrangement, the necessary length of the shaft part which guides the stop member in the optical axis direction can be shortened to lessen a protruding amount of the shaft part to be obtained when the stop member is completely pushed inward. This arrangement, therefore, permits reduction in size of the lens barrel in the optical axis direction.

Further, with a guide part which receives the shaft part arranged to extend along the optical axis from a specific lens, that arrangement effectively prevents the shaft part from becoming aslant with respect to the optical axis so that the flatness of the stop member can be adequately retained.

According to the invention, the stop member is arranged to be urged to move away from a specific lens in the optical axis direction by an urging means such as a spring or the like provided around its shaft part. The arrangement enables the stop member to follow another lens when that lens moves away from the specific lens.

According to the invention, the plate thickness of the stop member is arranged to be not greater than 1 mm. The arrangement effectively prevents generation of a ghost caused by light reflected by the inner circumferential portion of an aperture part.

Further, according to the invention, with the stop member attached, for example, to a lens located in the middle part among three lenses and arranged to be pushed and moved by the lenses located on both sides, a resistance imparting means is arranged to give some resistance to the movement of the stop member. The arrangement effectively prevents the stop member from being readily moved by vibrations, shocks or the like.

I claim:

1. A lens barrel comprising:
   a lens unit arranged to be movable in an optical axis direction;
   a plurality of shafts which hold a stop arranged to block undesirable light and which extend in the optical axis direction; and
   a support member which supports said plurality of shafts while allowing said plurality of shafts to be moved in the optical axis direction,
   wherein said plurality of shafts are moved by being pushed by said lens unit, thereby moving said stop.

2. A lens barrel according to claim 1, wherein said plurality of shafts are three in number, and said three shafts are evenly spaced at even angular spaces.

3. A lens barrel according to claim 1, wherein said stop and said plurality of shafts are integrally molded.

4. A lens barrel according to claim 1, further comprising an elastic member which urges said stop and said plurality of shafts toward said lens unit.

5. A lens barrel according to claim 1, wherein said stop is provided at fore end parts of said plurality of shafts located on the side of said lens unit.

6. A lens barrel according to claim 1, wherein said stop is provided at fore end parts of said plurality of shafts on one side thereof opposite to other fore ends located on the side of said lens unit.

7. A lens barrel according to claim 4, wherein said elastic member includes a plurality of springs, said plurality of springs corresponding respectively to said plurality of shafts, and each of said plurality of springs being provided so as to encompass a part of the corresponding shaft.

8. A lens barrel according to claim 1, wherein said stop is not greater than 1 mm in thickness.

9. A lens barrel according to claim 1, wherein said support member has a plurality of bearing parts which extend in the optical axis direction, each of said plurality of shafts being inserted into each corresponding one of said plurality of bearing parts.

10. A lens barrel according to claim 9, wherein to an inner face of each of said plurality of bearing parts is applied a material for adjusting a frictional force applied to said corresponding shaft.

11. A lens barrel comprising:
    a first lens unit arranged to be movable in an optical axis direction; and
    a second lens unit which supports a plurality of shafts while allowing said plurality of shafts to be moved in the optical axis direction, said plurality of shafts holding a stop arranged to block undesirable light and extending in the optical axis direction,
    wherein said plurality of shifts are moved by being pushed by said first lens unit, thereby moving said stop.

12. A lens barrel according to claim 11, wherein said plurality of shafts are three in number, and said three shafts are evenly spaced at even angular spaces.

13. A lens barrel according to claim 11, wherein said stop and said plurality of shafts are integrally molded.

14. A lens barrel according to claim 11, further comprising an elastic member which urges said stop and said plurality of shafts toward said first lens unit.

15. A lens barrel according to claim 11, wherein said stop is provided at fore end parts of said plurality of shafts located on the side of said first lens unit.

16. A lens barrel according to claim 11, wherein said stop is provided at fore end parts of said plurality of shafts on one side thereof opposite to other fore end parts located on the side of said first lens unit.

17. A lens barrel according to claim 14, wherein said elastic member includes a plurality of springs, said plurality of springs corresponding respectively to said plurality of shafts, and each of said plurality of springs being provided so as to encompass a part of the corresponding shaft.

18. A lens barrel according to claim 11, wherein said second lens unit is arranged to be movable in the optical axis direction.

19. A lens barrel according to claim 18, wherein said first and second lens units are arranged to be movable in association with each other in the optical axis direction so as to effect zooming.

20. A lens barrel according to claim 11, wherein said stop is not greater than 1 mm in thickness.

21. A lens barrel according to claim 11, wherein said second lens unit has a plurality of bearing parts which extend in the optical axis direction, each of said plurality of shafts being inserted into each corresponding one of said plurality of bearing parts.

22. A lens barrel according to claim 21, wherein to an inner face of each of said plurality of bearing parts is applied a material for adjusting a frictional force applied to said corresponding shaft.

23. A lens barrel comprising:

first and third lens units arranged to be movable in an optical axis direction; and a second lens unit disposed between said first and third lens units, said second lens unit supporting a plurality of shafts while allowing said plurality of shafts to be moved in the optical axis direction, said plurality of shafts holding a stop arranged to block undesirable light and extending in the optical axis direction, wherein said plurality of shafts are moved by being pushed by said first lens unit toward said third lens unit, thereby moving said stop toward said third lens unit, and wherein said plurality of shafts are moved by being pushed by said third lens unit toward said first lens unit, thereby moving said stop toward said first lens unit.

24. A lens barrel according to claim 23, wherein said plurality of shafts are three in number, and said three shafts are evenly spaced at even angular spaces.

25. A lens barrel according to claim 23, wherein said stop and said plurality of shafts are integrally molded.

26. A lens barrel according to claim 23, wherein said second lens unit is arranged to be movable in the optical axis direction.

27. A lens barrel according to claim 26, wherein said first, second and third lens units are arranged to be movable in association with each other in the optical axis direction so as to effect zooming.

28. A lens barrel according to claim 23, wherein said stop is not greater than 1 mm in thickness.

29. A lens barrel according to claim 23, wherein said second lens unit has a plurality of bearing parts which extend in the optical axis direction, each of said plurality of shafts being inserted into each corresponding one of said plurality of bearing parts.

30. A lens barrel according to claim 29, wherein to an inner face of each of said plurality of bearing parts is applied a material for adjusting a frictional force applied to said corresponding shaft.

31. A lens barrel comprising:

a movable unit arranged to move in an optical axis direction;

a shaft which holds a stop arranged to block undesirable light and which extends in the optical axis direction; and a support member which supports said shaft while allowing said shaft to be moved in the optical axis direction, wherein said shaft is moved by being pushed by said movable unit, thereby moving said stop.

32. An optical apparatus, such as a camera, having a lens barrel according to any one of claims 1 to 31 and arranged to obtain image information through said lens barrel.

* * * * *